United States Patent
Alexander et al.

(10) Patent No.: US 11,617,081 B1
(45) Date of Patent: *Mar. 28, 2023

(54) PASSIVE AUTHENTICATION DURING MOBILE APPLICATION REGISTRATION

(71) Applicant: Wells Fargo Bank, N.A., San Francisco, CA (US)

(72) Inventors: Ryan S. Alexander, Mill Creek, WA (US); Lei Han, San Francisco, CA (US); Prafullata Diwate, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 17/235,115

(22) Filed: Apr. 20, 2021

Related U.S. Application Data

(63) Continuation of application No. 16/146,487, filed on Sep. 28, 2018, now Pat. No. 10,999,734.

(51) Int. Cl.
*H04W 12/06* (2021.01)
*H04L 9/40* (2022.01)
*G06F 9/54* (2006.01)

(52) U.S. Cl.
CPC .............. *H04W 12/06* (2013.01); *G06F 9/54* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 8,965,342 B1 | 2/2015 | Efrati et al. |
| 9,106,665 B2 | 8/2015 | Ahmed et al. |
| 10,686,781 B1 | 6/2020 | Kaditz et al. |
| 2009/0241175 A1 | 9/2009 | Trandal et al. |
| 2011/0306320 A1 | 12/2011 | Saunders et al. |
| 2014/0006517 A1 | 1/2014 | Hsiao et al. |
| 2014/0074569 A1 | 3/2014 | Francis et al. |
| 2014/0143149 A1 | 5/2014 | Aissi |
| 2015/0249540 A1 | 9/2015 | Khalil et al. |
| 2015/0365778 A1 | 12/2015 | Khan et al. |
| 2016/0127898 A1 | 5/2016 | Gupta et al. |
| 2016/0173481 A1 | 6/2016 | Kwon et al. |

(Continued)

OTHER PUBLICATIONS

Biscontini, Tyler, "Application Programming Interface," Salem Press Encyclopedia of Science, p. 1-4 (Year: 2019).

*Primary Examiner* — Bassam A Noaman
(74) *Attorney, Agent, or Firm* — Foley & Lardner LLP

(57) ABSTRACT systems and methods are presented for passively authenticating users of a native application running on a mobile communications device. The user may be applying for a service, product, access, etc. from a provider computing system. A unique device identifier of the device may be acquired and provided to a first computing system. A mobile telephone number associated with the device may be received at the device. User information may be accepted from the user via a user interface of the device for entry into a set of fields. The mobile telephone number may be verified by determining, via a second computing system that is different from the first computing system, that the mobile telephone number is associated with the user information. The service/product/access for the user may be approved in response to verification of the mobile telephone number. The user may be authenticated without challenge questions.

20 Claims, 6 Drawing Sheets

(56) References Cited

U.S. PATENT DOCUMENTS

| | | |
|---|---|---|
| 2017/0026369 A1 | 1/2017 | Hao et al. |
| 2018/0176222 A1 | 6/2018 | Bhaskar et al. |
| 2019/0116493 A1 | 4/2019 | Cyril et al. |
| 2020/0067705 A1 | 2/2020 | Brown et al. |

PASSIVE AUTHENTICATION DURING MOBILE APPLICATION REGISTRATION

CROSS-REFERENCE TO RELATED APPLICATIONS

This application is a continuation of U.S. patent application Ser. No. 16/146,487, filed on Sep. 28, 2018, entitled "Passive Authentication During Mobile Application Registration," which is incorporated herein by reference in its entirety.

TECHNICAL FIELD

The present disclosure relates to systems and methods for authenticating a user, who may be registering or applying for a service, product, or account from a service provider or otherwise requesting security access, and to a client application capable of passively authenticating users.

BACKGROUND

Users of computing devices are frequently remote to service providers that provide services to users via a networked provider computing system. Often, the service provider needs to verify the identity of the user before providing services to maintain security of sensitive information, but the physical separation means the service provider often must authenticate the user without seeing or hearing the user. The service provider may verify the identity of a user of a computing device by requesting that the user provider certain information available to the user but not expected to be available to unauthorized persons. This may be accomplished using a one-time passcode (OTP), which may be a temporary passcode transmitted via e-mail or telephone, or out-of-wallet (OOW) questions, which may be questions derived from personal information related to the user.

However, such security measures are computationally costly, time intensive, and burdensome for users. They also may require that the user have ready access to a device or e-mail account via which the OTP is transmitted, and/or to recall the information being requested via OOW questions. If the user does not have access to the device or e-mail account or does not recall the information, the user is not authenticated and is thus not provided services or otherwise is not allowed to proceed. This is at least a significant inconvenience to legitimate users, and a potential cause of lost opportunities for the service provider who turns away legitimate users.

SUMMARY

Various embodiments of the disclosure relate to systems and methods of authenticating a user of a mobile communications device. The user may be using an application (such as a native application) running on the mobile communications device. The user may be using the application to apply/register for at least one of a service, a product, and an account via a provider computing system of a service provider. The provider computing system may require authentication of the user before approving the service or product or otherwise before allowing the user to proceed. A perceptible element may be presented by the application via one or more user interfaces of the mobile communications device. The perceptible element may include at least one prompt configured to identify user information to apply or register for the service, product, account, etc. A unique device identifier may be acquired by the application. The unique device identifier may be acquired by the application via an operating system of the mobile communications device. The unique device identifier may be stored locally at the mobile communications device. The unique device identifier may have been assigned to the mobile communications device independent of the user before the user acquired the mobile communications device. The unique device identifier may be transmitted to a carrier computing system as part of verifying the mobile communications device. The unique device identifier may be transmitted by the application via a network interface of the mobile communications device. The unique device identifier also be provided to the provider computing system or to a third-party computing system for transmission to the carrier computing system. A valid telephone number corresponding to the mobile communications device may be received from the carrier computing system. The telephone number may be received from the carrier computing system by the application running on the mobile communications device. The telephone number may also be received from the carrier computing system by the provider computing system, which may transmit the telephone number to the application. The telephone number may also be received by the third-party computing system, which may transmit the telephone number to the application, and/or to the provider computing system which may transmit the telephone number to the application. The carrier computing system may be a computing system of a telecommunications operator or an aggregator of telecommunications operator data. The telephone number may have been assigned to the mobile communications device via the telecommunications operator. The application may receive user information from the user via the one or more user interfaces of the mobile communications device. The user information may be provided by the user in response to the at least one prompt. The telephone number from the carrier computing system may be verified by determining that the telephone number is associated with the user information received via the one or more user interfaces. The telephone number may be associated with the user information in at least one of a third-party computing system of a third party and the provider computing system. The user may be approved for the service or product, or otherwise allowed to proceed, in response to verification of the mobile communications device and separate verification of the telephone number. The user may be authenticated without use of a one-time-passcode (OTP) and/or without use of an out of wallet (OOW) question.

Various embodiments of the disclosure relate to mobile communications devices, and particularly smartphones. A network interface may be configured to communicate data with a provider computing system of a service provider via a network. One or more user interfaces may present visually-perceptible elements and receive inputs from a user. The smartphone may also include a processor and a memory having stored thereon an application for authenticating a user of a smartphone. The user may be applying, via the application, for a service or product from the provider computing system, or otherwise requesting information or access via a portal. The provider computing system may require authentication of the user before approving the service, product, or account, or otherwise allowing the user to proceed (e.g., to receive the information or be provided access). The application may include instructions executable by the processor. A visually perceptible element may be displayed using the one or more user interfaces of the smartphone. The visually perceptible element may include one or more fields configured to identify user information requested to apply for the service or product, register for the account, or otherwise proceed. A unique device identifier of the smartphone may be acquired. The unique device identifier may be locally stored at the smartphone. The unique device identifier may be acquired via an operating system of the smartphone by the application. The unique device identifier may be provided, directly or via the provider computing system, to a carrier computing system in verifying the smartphone. A valid telephone number corresponding to the smartphone may be received, directly or via the provider computing system. The telephone number may be prefilled into a visually-perceptible field corresponding to a telephone number of the user. User information may be accepted from the user via the one or more user interfaces of the smartphone. The user information may be entries into the one or more fields. The telephone number received may be verified by determining that the telephone number is associated with the user information received via the one or more user interfaces of the smartphone. The telephone may be determined to be associated with the user information via at least one of a third-party computing system of a third party and the provider computing system of the service provider. The provider computing system may approve the service or product, or otherwise allow the user to proceed, in response to verification of the smartphone and subsequent verification of the telephone number. An indication of approval may be received by the application from the provider computing system. A confirmation that the service, product, or access has been approved, or that the user may otherwise proceed, may be presented via the one or more user interfaces. The user may be authenticated without being presented with challenge questions.

Various embodiments of the disclosure relate to methods and systems for authenticating a user of a mobile communications device. The user may be authenticated while applying for a service or product from a provider computing system. The user may be using an application running on the mobile communications device to, for example, apply for a service or product, request access to information or a user portal, and/or register for an account. The application may be a native application. The provider computing system may require authentication of the user before allowing the user to proceed (e.g., before approving the service or product). The mobile communications device may be assigned or registered to a telephone number by a telecommunications operator. The telephone number may be used to route communications between the mobile communications device of the user and other mobile communications devices with other telephone numbers. A visually perceptible element may be presented via the application via one or more user interfaces (such as a display screen) of the mobile communications device. The visually perceptible element may include a set of fields identifying user information being requested before the user may proceed (e.g., information for applying for the service or product or registering for an account). A unique device identifier of the mobile communications device, which may be stored on the mobile communications device, may be acquired. The unique device identifier may be acquired by the application via an operating system of the mobile communications device. The unique device identifier may have been assigned to the mobile communications device before the mobile communications device was available for sale to consumers. The unique device identifier may be transmitted to a first computing system. The unique device identifier may be transmitted to the first computing system by at least one of the provider computing system and the application. A valid telephone number corresponding to the mobile communications device may be received at the application. The telephone number may be received by the application directly from the first computing system, or the provider computing system may receive the telephone number from the first computing system and transmit the telephone number to the mobile communications device. The first computing system may be a carrier computing system. User information may be accepted from the user via the one or more user interfaces of the mobile communications device as entries into the set of fields. The telephone number may be verified by determining that the telephone number is associated with the user information. The telephone number may be determined to be associated with the user information via a second computing system that is different from the first computing system. The second computing system may be the provider computing system or a third-party computing system. The service, product, access, account, etc., may be approved for the user in response to verification of the telephone number. The service, product, account, access, etc. may be approved, or the user may be otherwise permitted to proceed, by at least one of the provider computing system and the application. The user may be authenticated without being presented with challenge questions.

DETAILED DESCRIPTION

Figure 1:
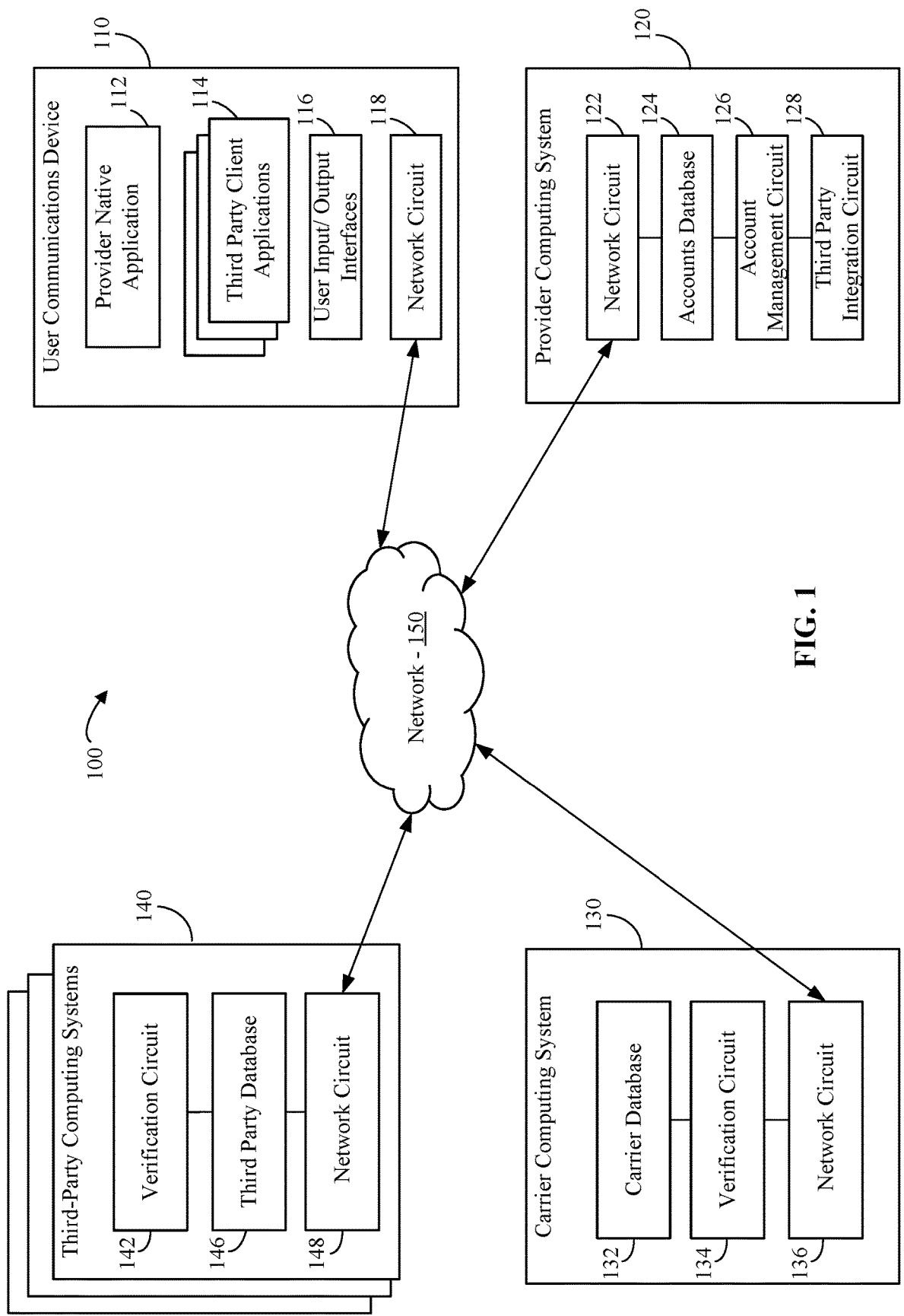
FIG. 1 is a block diagram of a computer-implemented system, according to one or more example embodiments.

Various embodiments described herein relate to systems and methods for providing users with more efficient authentication that is capable of saving computing resources and time and reducing the burden and inconvenience to users being authenticated while maintaining or enhancing security.

A significant amount of computing resources is devoted to maintaining security and reducing or preventing fraud. Verifying the identity of a user is often accomplished by asking the user to provide private information or to provide information acquired through private channels (such as an e-mail or text message to a verified e-mail address or telephone number of the user). But the process of determining which questions to ask, generating passcodes, questions, and security screens, awaiting responses from the user, and retrying in case of errors and/or failed attempts, is costly in terms of time and computing resources. For example, a mobile device uses processing power, memory, battery, time, etc., to request or issue security questions intended to challenge or "test" the knowledge of users, who provide information that is likely (presumably) only known to the user or to someone authorized by the user.

The authentication process causes delays when a device awaits a response from the user. While the response is pending, a portion of the memory is used to implement the presentation of the inquiry and a manner of responding thereto. During this time, the battery continues to drain. Such delays may inconvenience and deter users. Requiring less involvement by users would thus tend to reduce the need for computing resources and reduce costly delays. Advantageously, the user can be authenticated seamlessly via back-end processes. The disclosed approach can be used to rebalance the burden of authentication away from the user and instead towards the computing systems and/or devices with which the user interacts. The user may be presented with fewer, or no, prompts or pages devoted to security questions intended to "challenge" the user to provide information so as to confirm identity or otherwise authenticate the user. For example, the user may not be presented with a prompt for a one-time-passcode (OTP) or an out of wallet (OOW) question. As used herein, a challenge question or security question is a request for information that is already known, and the response to the challenge question or security question is to be compared with the already-known information for authentication purposes.

In various implementations, a service provider provides or otherwise facilitates the operation of a client application on a user device. The client application may be a native application that is downloaded and installed by the user to be run on the user device. The user device may be a mobile device, such as a mobile communications device (e.g., a smartphone). The client application may be provided to users via a provider computing system of the service provider, either directly or via a digital application distribution platform (e.g., "Google Play" or Apple's "App Store"). The (native) application may be configured to enable access to one or more services of the service provider, including the ability to request or register for a new service from the service provider via the provider computing system.

In example embodiments, user authentication may begin by first authenticating the mobile communications device being used by the user. In certain implementations, this is accomplished via a computing system of a telecommunications operator or carrier, such as a telephone or other telecommunications service provider (TSP) with a carrier network. In some implementations, this is accomplished by directly communicating with a computing system of the telecommunications operator. Additionally or alternatively, this is accomplished by communicating with, for example, a carrier aggregator that maintains a record of which telephone numbers (or other numbers that can be used to communicate with a user via a user communications device) are registered to which mobile communications devices (e.g., smartphones) for one or more telecommunications operators/carriers. The computing system of the entity (e.g., telecommunications operator with a carrier network and/or a carrier aggregator) involved in the authentication or verification of the mobile communications device may be referred to herein as a carrier computing system. The carrier computing system may be used to authenticate the mobile communications device by the provider computing system 120, the native application 112, and/or the third-party computing system 140, as further discussed below.

In various embodiments, the carrier computing system (e.g., a computing system of a telecommunications operator, carrier aggregator, or other related or affiliated entity) receives a unique device identifier of the mobile communications device. In certain implementations, the unique device identifier is acquired by the native application via an operating system (or components thereof) of the mobile communications device running the native application. In some implementations, the native application may provide the unique device identifier to the computing system of the telecommunications operator and/or the carrier aggregator directly. In certain implementations, the native application may provide the unique device identifier to the provider computing system, which then provides the unique device identifier to the computing system of the telecommunications operator and/or the carrier aggregator. In other implementations, the native application and/or the provider computing system accesses a carrier computing system (or the data available thereto) via a third-party computing system.

In various versions, the telecommunications operator computing system or the carrier aggregator computing system receives the unique device identifier and determines which mobile telephone number is associated with or registered to the mobile communications device. In some implementations, the computing system of the telecommunications operator or carrier aggregator may receive the mobile telephone number from the mobile communications device (e.g., via the native application) and/or from the provider computing system. In various embodiments, the computing system telecommunications operator or carrier aggregator computing system may additionally or alternatively receive other data related to the mobile communications device or the operating environment thereof for verification, such as, for example, the mobile telephone number (e.g., for confirmation that the mobile telephone number is associated with the unique device identifier), the network status, name, etc. In some implementations, the carrier computing system receives various data from multiple sources. For example, the carrier computing system receives the unique device identifier from the provider computing system or the mobile communications device, and receives an associated mobile telephone number from a third-party computing system.

In some implementations, the telecommunications operator computing system or the carrier aggregator computing system receiving the unique device identifier determines whether the mobile communications device has been reported to be lost or stolen. For example, the first authentication or verification process may determine that the mobile communications device (e.g., smartphone) is not reported stolen, is active (e.g., can be used to make telephone calls), and/or is associated with a particular mobile telephone number. This determination may be made via a computing system of a telecommunications operator (e.g., a company providing telephone services), via a carrier aggregator that collects data from multiple telecommunications operators, and/or via a third-party computing system. This first verification may be accomplished without presenting a challenge question to the user via the user communications device.

If the mobile communications device is not reported lost or stolen, and a mobile telephone number is registered to the mobile communications device, the mobile telephone number may be returned by the telecommunications operator computing system or the carrier aggregator computing system to the provider computing system, the third-party computing system, and/or to the native application. In some implementations, the mobile telephone number is provided with an indication or confirmation that the mobile communications device is not reported lost or stolen, is currently active, is usable for communications, and/or is otherwise in good standing (e.g., that there are no past due invoices for telecommunications services).

Alternatively or additionally, the native application may retrieve the mobile telephone number of the mobile communications device (e.g., via the operating system of the mobile communications device), and the provider computing system, the third-party computing system, and/or the native application may provide the mobile telephone number to the carrier computing system. In response, rather than returning the mobile telephone number, the carrier computing system may return a confirmation or other indicator to confirm or otherwise indicate that the mobile telephone number is registered (or otherwise corresponds) to the unique device identifier.

With the mobile telephone number received and/or confirmed via the carrier computing system (e.g., by the provider computing system, the third-party computing system, and/or the mobile communications device), the native application may proceed to obtain user information from the user via a user interface (e.g., touchscreen, microphone, keyboard, stylus, etc.) of the mobile communications device. The user information is acquired to determine whether to approve the request for the new service, product, account, or other access from the service provider, and will be used to facilitate the provision of services by the service provider. In some embodiments, the mobile telephone number is displayed for the user, but not editable by the user.

Authenticating the user may proceed by next verifying the telephone number. In various embodiments, this may be accomplished by transmitting the mobile telephone number to a third-party computing system of a third party. The mobile telephone number may be provided to the third-party computing system by the provider computing system and/or the mobile communications device (e.g., via the native application). In various embodiments, the mobile telephone number is accompanied by certain user information obtained from the user as the user applies for the new service via the native application. The third-party computing system may verify that the mobile telephone number belongs to the user or is otherwise associated with or corresponds to the user information. The provider computing system and/or native application may then receive a confirmation or other indication from the third-party computing system that the mobile telephone number is associated with the user information provided by the user.

In some embodiments, the verification of the telephone number may be performed by the provider computing system itself, such as when, for example, the user is an existing customer or is otherwise known to the provider computing system. For example, the provider computing system may have a set of trusted, verified, and/or previously-used mobile telephone numbers stored in a database that can be accessed to determine that a certain mobile telephone number is associated with the user information.

Because of the significance of the services, products, or access, or the sensitivity of information to be disclosed or otherwise made available to the user, the provider computing system may require authentication to prevent, or otherwise reduce the likelihood of, unauthorized access and fraud. Maintaining security requires computing resources above and beyond the resources required to provide users with the services and information to be secured, and consequently, improving security protocols can reduce the drain on resources. The examples of security protocol improvements disclosed herein can enhance security while reducing computational cost, increasing efficiency, and reducing the burden on users.

For example, eliminating the need or use of an OTP in the authentication process reduces the computational and other costs associated with, for example, the devices, hardware components, instructions, and algorithms involved in: receiving a request for OTP authentication; generating an OTP (using, e.g., pseudorandomness or randomness); encrypting, transmitting, or otherwise delivering the OTP to, for example, a user device (e.g., a smartphone) or server (e.g., an e-mail server); presenting the OTP to a user of the user device (e.g., by presenting an e-mail or text message); accepting an entry of the OTP via a user interface of the user device; comparing the entry to the generated OTP to determine whether there is a match; and/or transmitting a result of the comparison to a device or computing system that is authenticating the user via the OTP.

Similarly, eliminating the need or use of OOW in the authentication process reduces the computational and other costs associated with, for example, the devices, hardware components, instructions, and algorithms involved in: receiving a request for OOW authentication; accessing one or more database sources for user data; generating an OOW question (by, e.g., determining what is known based on one or more databases and generating a question intended to solicit the known information); encrypting, transmitting, or otherwise delivering the OOW to a user; presenting the OOW to a user of the device (e.g., by presenting a webpage, e-mail, or text message); accepting a response to the OOW question via a user interface of the device; analyzing the response to determine whether the response acceptably demonstrates the desired knowledge; and/or transmitting a result of the analysis to a device or computing system that is authenticating the user via the OOW question. Eliminating the need or use of other security protocols analogously reduces computational costs, time, and inconvenience.

The disclosed systems, methods, and computer implementations also improve current computing systems by authenticating users via a reduced number of authenticated communications sessions. For example, mobile devices and computing systems involved in authentication transmit data (such as challenge/security questions, responses, requests for authentication, etc.) to each other as part of an authentication process. The data is transmitted securely to reduce the likelihood of, for example, interception by a fraudster. The data is thus communicated via one or more authenticated communications sessions.

For example, each time a communications session is established and communicating parties are authenticated with each other, time and computing resources are used. By reducing the number of communications sessions that are required for authenticating a user, the clock time, processing time, programmatic instructions, and other requirements of the central processing unit, memory utilization, and other system resources are reduced. Accordingly, the number of opportunities for error and breach is reduced, new services are approved more efficiently, and services are provided more quickly and reliably without as much delay or inconvenience for users.

In various implementations, the client application may allow the user to establish one or more new accounts with the service provider (such as opening a new financial account with a service provider that is a financial institution). For example, a user may open a new checking account, savings account, investment account, or credit card with a financial institution via a client application running on a mobile device of the user. In certain implementations, the new account details may be provided (e.g., by the native application) to a mobile wallet application or a third-party application running on the mobile communications device for immediate use.

In example embodiments, a user may be authenticated by a first verification that yields information (e.g., a telephone number) used by a second verification. In various implementations, the information is incorporated into the records of the user who is to receive the services of the service provider. Making the information part of the user's records makes the information more consequential and may also help deter fraud and thus enhance security. For example, if a fraudster is using a smartphone or other mobile communications device that can be traced back to the fraudster, the first verification acquires the telephone number of the smartphone and incorporates it into the records of the person being impersonated, allowing law enforcement or others to more easily identify the fraudster. It is relatively less likely that a fraudster would not only have the user information required to impersonate a user, but also have access to the mobile communications device registered to the user without the device having been reported to be lost or stolen.

Moreover, even if an imposter were to be authenticated, the imposter may not be able to reap any rewards from the impersonation, something that may further deter fraud. For example, if the service provider is a financial institution and the new service/product is a new credit card account for which the fraudster is approved, the information needed to use the credit card may not be provided to the imposter in usable form. For example, the credit card or relevant information may arrive in the mail several days later, or may be transmitted in an encrypted form to a mobile wallet application, which may require its own separate authentication (e.g., biometric data) to be usable.

When the user initially launches the native application and/or when the user selects opening a new account or other new service, in various implementations, the native application may communicate with the computing system of the service provider, telecommunications operator, carrier aggregator, or other third parties to authorize the user via back-end processes. From the user's perspective, authentication may be implemented passively, without requiring the user to actively prove his or her identity or authorization (via, e.g., security questions, challenge questions, OTP, OOW, etc.). By contrast, the routine, conventional approach to opening a new account or requesting other services requiring authentication is to have a user undertake active steps to verify his or her identity.

Further, when customers apply for new accounts or other services, the user may be notified at the conclusion of the process as to whether the customer has been approved. For example, a customer may apply for a credit card or bank account at a bank, and once the customer has provided all the requested information, and the bank has run any required credit or other checks, the customer may be notified shortly thereafter as to whether the new account has been approved or declined, or stalled due to a need for additional information. However, a new approved account is conventionally not usable for some time, such as until the user receives a physical mailing via a postal service with a credit or debit card or other account information. Conventionally, the user is unable to use the account to make a purchase at a merchant (e.g., at a point of sale terminal or online via an e-commerce platform) until some time later (e.g., for 5 to 10 business days), at which point the user may be required to manually enter the account information (e.g., account number, expiration date, etc.) needed for identifying the account to be able to use it in subsequent transactions. In example embodiments, however, an approved financial account may be made available to a mobile wallet or other application for use without further delay.

Referring now to FIG. 1, a block diagram of a computer-implemented system 100 for providing a client application with passive authentication features is shown, according to various example embodiments. The system 100 includes a user communications device 110 associated with a user, a provider computing system 120 associated with a service provider, such as a financial institution, a carrier computing system 130 associated with a telecommunications operator or carrier aggregator, and one or more third-party computing systems 140 associated with various third parties. The various systems and devices may be communicatively and operatively coupled through a network 150, which may include one or more of the Internet, telephone network, cellular network, Wi-Fi, Wi-Max, a proprietary banking network, or any other type of wired or wireless network or a combination of wired and wireless networks. As described herein, the system 100 may be used to provide client applications on the user communications device 110, such as client applications of the service provider (e.g., native application 112) or of third-parties (e.g., client applications 114).

Third party computing systems 140 are computing systems associated with various third parties. As used herein with respect to third party computing systems 140, "third parties" refer to entities that provide various services or products, such as electronic (e.g., web or application-based) services. While conventionally these third parties provide their services independent of the service provider, according to the present disclosure, the system 100 includes various features to facilitate the integration of the services provided via the third party computing systems 140 and those provided by the service provider (via, e.g., application programming interfaces (APIs)). The "services" may include, but are not limited to, identity and device verification, and other authentication services.

Each third party computing system 140 may include a verification circuit 142, a third party database 146, and a third party network circuit or interface 148 that enables the third party computing system 140 to exchange data, information, values, and the like over the network 150. The third party database 146 is structured to retrievably store user information relating to user relationships with the third party, and may include non-transient data storage mediums (e.g., local disc or flash-based hard drives, local network servers, and the like) or remote data storage facilities (e.g., cloud servers). Third party database 146 may include information pertaining to user accounts with the third party. The information stored in the third party database 146 varies depending on the particular service provided by the third party computing system 140.

The third party verification circuit 142 is structured to verify user or device information. As will be appreciated, the functionalities performed by the third party verification circuit 142 will vary depending on the services provided by the third party computing system 140. In some embodiments, the third party verification circuit 142 is configured to provide another computing system (e.g., provider computing system 120) the capability of verifying information related to users of user communications devices 110. In various embodiments, the third party computing system 140 provides for various application programming interfaces (APIs) that facilitate, enable, or otherwise permit other computing systems (e.g., the provider computing system 120) to verify user information.

The carrier computing system 130 is structured to permit, enable, facilitate, manage, process, and otherwise allow other computing systems (e.g., the provider computing system 120 and/or third-party computing systems 140) to verify the user mobile communications device 110. As used herein, the term "carrier" may refer to a telecommunications operator providing telecommunications services (e.g., AT&T, Sprint, Verizon, or other operator) or a carrier aggregator which aggregates telecommunications operator data (e.g., unique device identifiers and the mobile telephone numbers assigned thereto). The carrier computing system 130 is shown to include carrier database 132 in which data may be stored. In various configurations, the carrier computing system 130 may provide a verification circuit 134 capable of verifying, for example, the mobile telephone number associated with a unique device identifier, the unique device identifier associated with a mobile telephone number, etc. A network circuit or interface 136 may enable the carrier computing system 130 to exchange data over the network 150. The carrier computing system 130 may be configured to exchange data with the user communications device 110, provider computing system 120, and/or the third party computing systems 140 in various implementations.

The provider computing system 120 may, in some implementations, be a computing system at or associated with a financial institution that provides and maintains one or more financial accounts (e.g., demand deposit account, credit or debit card account, brokerage account, mortgage account, etc.) on behalf of the user. In some arrangements, the financial institution is an issuer of a payment vehicle held by the user. The payment vehicle may be used as a source payment vehicle for transactions engaged in via, for example, the user's mobile wallet. In the context of the present disclosure, the financial institution can include commercial or private banks, credit unions, investment brokerages, mobile wallet providers, and so on. The financial institution can also include any commercial entity capable of maintaining payment vehicles on behalf of a user, including retailers, vendors, service providers, and the like. In other implementations, the provider computing system 120 may be a computing system of a non-financial service provider, such as a merchant, an online marketplace, a ride-share, lodging-share, or other "sharing" services provider, etc.

The provider computing system 120 includes a network circuit 122 structured to enable the provider computing system 120 to exchange data over the network 150, an accounts database 124, an account management circuit 126, and a third party integration circuit 128. The accounts database 124 is structured to retrievably store user information relating to the various operations discussed herein, and may include non-transient data storage mediums (e.g., local disc or flash-based hard drives, local network servers, and the like) or remote data storage facilities (e.g., cloud servers). The accounts database 124 may include personal information (e.g., names, addresses, phone numbers, and so on), authentication information (e.g., username/password combinations, device authentication tokens, security question answers, unique customer identifiers, biometric data, etc.), and financial information (e.g., token information, account numbers, account balances, available credit, credit history, transaction histories, and so on) relating to the various users and associated accounts (financial or otherwise).

The account management circuit 126 may be structured to manage the accounts of various users, including maintaining and handling transaction processing for the user's one or more financial accounts. In some embodiments, the provider client application (herein "native application") 112 may be provided by the account management circuit 126. In this regard, the account management circuit 126 may be configured to provide information, values, commands, and the like used to render various displays to aid the user in accessing the various functionalities described herein.

The native application 112 may configure the user communications device 110 to request such information from the provider computing system 120 at various points in various data processing flows associated with functionalities provided via the provider application 112. For example, as described herein, a multi-feature GUI of the native application 112 may provide a preliminary question (see, e.g., FIG. 5), prompt for user information (see, e.g., FIG. 6), etc. As such, upon the user's launch or initiation of the native application 112 on the user communications device 110, the user communications device 110 may request a new service from the provider computing system 120. In response to the request, the provider computing system 120 may provide preliminary information and/or may begin to authenticate the user of the user communications device 110.

The third party integration circuit 128 is configured to arbitrate or otherwise manage various verification requests to the carrier computing system 130 and/or the third party computing systems 140. In some implementations, verification requests to the carrier computing system 130 are direct or, in other implementations, are indirect (e.g., via a third party computing system 140). Similarly, verification requests to a third party computing system 140 may be direct or indirect (e.g., via a carrier computing system 130). In this regard, in various embodiments, the third party integration circuit 128 may utilize a plurality of APIs that facilitate the exchange of varying types of information with different computing systems.

The user communications device 110 is a computing device associated with the user. The user may include one or more individuals, business entities, government entities, and agents. The user communications device 110 may be structured to exchange data over the network 150, execute software applications, access websites, generate or at least partly generate or provide/present GUIs, and perform other operations described herein. In various implementations, the user communications device 110 may include any sort of computing device, such as a smartphone, personal computer, a wearable computing device (e.g., eyewear, a watch or bracelet, etc.), a tablet, a portable gaming device, a laptop, and any other form of computing device (e.g., a smart appliance, a smart speaker, etc.). The user communications device 110 is capable of communications via a mobile telephone number that can be used to route communications to/from the user communications device 110 (via, e.g., a telephone or other network). In various implementations, the mobile telephone number is a static value that is associated with the unique device identifier and is not changeable by the user without involvement by a telecommunications operator.

In the example shown, the user communications device 110 includes a provider native application 112, third party client applications 114, user input/output ("I/O") interfaces 116, and a network circuit or interface 118 enabling the user communications device 110 to exchange information over the network 150. The user interfaces 116 include hardware and associated logics configured to enable the user communications device 110 to exchange information with a user and other devices (e.g., a merchant transaction terminal). An input aspect of the user interfaces 116 allows the user to provide information to the user communications device 110, and may include, for example, a mechanical keyboard, a touchscreen, a microphone, a camera, a fingerprint scanner, any user input device engageable to the user communications device 110 via a USB, serial cable, Ethernet cable, and so on. An output aspect of the user interfaces 116 allows the user to receive information from the user communications device 110, and may include, for example, a display screen, a speaker, illuminating icons, LEDs, and so on. The user interfaces 116 may include systems, components, devices, and apparatuses that serve both input and output functions, allowing the provider computing system 120 to exchange information with the user communications device 110. Such systems, components, devices and apparatuses include, for example, radio frequency transceivers (e.g., RF or NFC-based transceivers) and other short range wireless transceivers (e.g., Bluetooth®, laser-based data transmitters, etc.).

The provider native application 112 may be structured to facilitate and permit conductance of transactions (e.g., a payment for a good or service at a point of sale, a funds transfer between accounts, etc.) and opening and management of accounts held by the user (e.g., at a financial institution associated with the provider computing system 120 and/or other financial institutions). Accordingly, in some arrangements, the provider native application 112 is communicably coupled via the network circuit or interface 118 over the network 150 to the provider computing system 120. In some embodiments, the provider native application 112 includes a circuit embodied within the user communications device 110. For example, the provider native application 112 may include program logic stored in a system memory of the user communications device 110. In such arrangements, the program logic may configure a processor of the user mobile device to perform at least some of the functions described herein with respect to the provider native application 112. As will be understood, the level of functionality that resides on the user communications device 110 versus the provider computing system 120 will vary depending on the implementation.

In some embodiments, the provider native application 112 includes or is otherwise associated with a mobile wallet implemented on the user communications device 110. For example, the provider native application 112 may include a mobile wallet circuit therein that facilitates communications via the user communications device 110 to the third party computing system 140 and/or to the provider computing system 120 enabling access to a user mobile wallet. In such embodiments, the provider native application 112 is structured to permit mobile wallet users to engage in transactions through the initiation of communications with, for example, a merchant point of sale ("POS") device. For example, in some embodiments, the provider native application 112 includes a payment application facilitating exchange of mobile wallet credentials (e.g., tokenized account information) with the POS device. In this regard, the provider native application 112 may interface with a near field communications (NFC) chip controller to exchange the mobile wallet credentials.

It should be understood that the role that the provider native application 112 takes in payment transactions will depend on the implementation of the mobile wallet. In some arrangements, for example, the mobile wallet is implemented in a secure element framework. In such arrangements, the user communications device 110 includes a secure element that is separate from the main system memory of the user communications device 110. The secure element refers to a tamper-resistant platform that hosts various applications and confidential information associated therewith. The secure element may include, but is not limited to, a universal subscriber identity circuit (a SIM card), a trusted execution environment, and/or a secure digital card. In such arrangements, user authentication information (e.g., payment account information, user PINs, and the like) is stored in the secure element. In various arrangements, the secure element of the user communications device 110 may include a payment application that interfaces with the NFC chip of the user device responsive to receiving a communication (e.g., an application protocol data unit) from the POS device to enable user payment information be transferred. In such arrangements, no user information is transferred by the provider native application 112 to the NFC chip. After user payment information is transmitted to the POS device, the provider native application 112 may query the secure element for transaction data to notify the user of the completed transaction.

In other arrangements, the provider native application 112 may operate under a host card emulation framework. In such arrangements, user payment information is maintained within the provider native application 112 or cloud-based environment (e.g., a host emulation service) rather than in the secure element. In this regard, the provider native application 112 may include a service component (e.g., a payment application) configured to interface with the NFC chip of the user communications device 110 to communicate user payment tokens to the merchant point of sale device. To ensure security of user information, the provider native application 112 may include sandboxing functionalities where a unique user ID (UID) is assigned to the provider native application 112, and where only other applications (e.g., third party client applications 114) including the same UID may share information stored in relation to the provider native application 112.

In various other arrangements, the user-specific payment information may be stored in a trusted execution environment ("TEE") within the user communications device 110. The systems and methods disclosed herein may also be used with other modalities currently available for storage and transfer of user payment device via contactless communication mechanisms. In some examples, the provider native application 112 operates under an HCE framework. As such, to conduct a mobile wallet transaction utilizing the provider native application 112, the user communications device 110 may communicate with the third party computing system 140 (or other system) to retrieve a token for use in the mobile wallet transaction.

In some arrangements, the provider native application 112 is structured to enable the user to manage a mobile wallet and other accounts held at a financial institution associated with the provider computing system 120. In this regard, the provider native application 112 includes a presentation tier configured to control and manage displays or GUIs presented to the user via the provider native application 112. As described herein, the presentation tier includes access points to a diverse array of functionalities to streamline the user's experience. For example, the presentation tier may be configured to present the user with the GUIs described with respect to the figures herein.

In some embodiments, the provider native application 112 includes an interactive chat bot feature enabling the user to dictate data process flows by inputting commands in everyday language. For example, in some embodiments, the provider native application 112 includes a function-to-keyword lookup table such that a corresponding function of the provider native application 112 is called in response to the user inputting a command. In one example, the user may provide an input (e.g., by typing a message into a message prompt or providing a voice command) to view a balance of a checking account. In response, via the function-to-keyword lookup table, an appropriate function is called to request balance information of the checking account from the provider computing system 120 and present it to the user. Other functionalities (e.g., the mobile wallet, bill payments, card-free ATM, etc.) described herein may be accessed in a similar manner. As such, the provider native application 112 provides personable access to various features described herein.

Third party client applications 114 are structured to provide the user with access to services offered by various third parties. In some arrangements, the third party client applications 114 are hard coded into the memory of the user communications device 110. In other embodiments, these applications may be web-based interface applications, where the user has to log onto or access the web-based interface before usage, and these applications are supported by a separate computing system comprising one or more servers, processors, network interface circuits, or the like (e.g., third party computing systems 140), that transmit the applications for use to the mobile device.

In various embodiments, the third party applications 114 include elements providing access to products offered by or otherwise associated with the service provider. For example some such products may be related to conducting various forms of transactions (e.g., via a mobile wallet, bill payments, etc.) using services provided by the service provider. Accordingly, the third party applications 114 may include applets exposing various elements enabling the user to access services offered by the service provider within the third party application 114. Such access may be enabled or otherwise facilitated by various APIs. For example, one API may enable a transfer of user account information to a third party computing system 140 to facilitate the user selecting an account and making a payment within the third party computing system 140 (e.g., via the mobile wallet).

Figure 2:
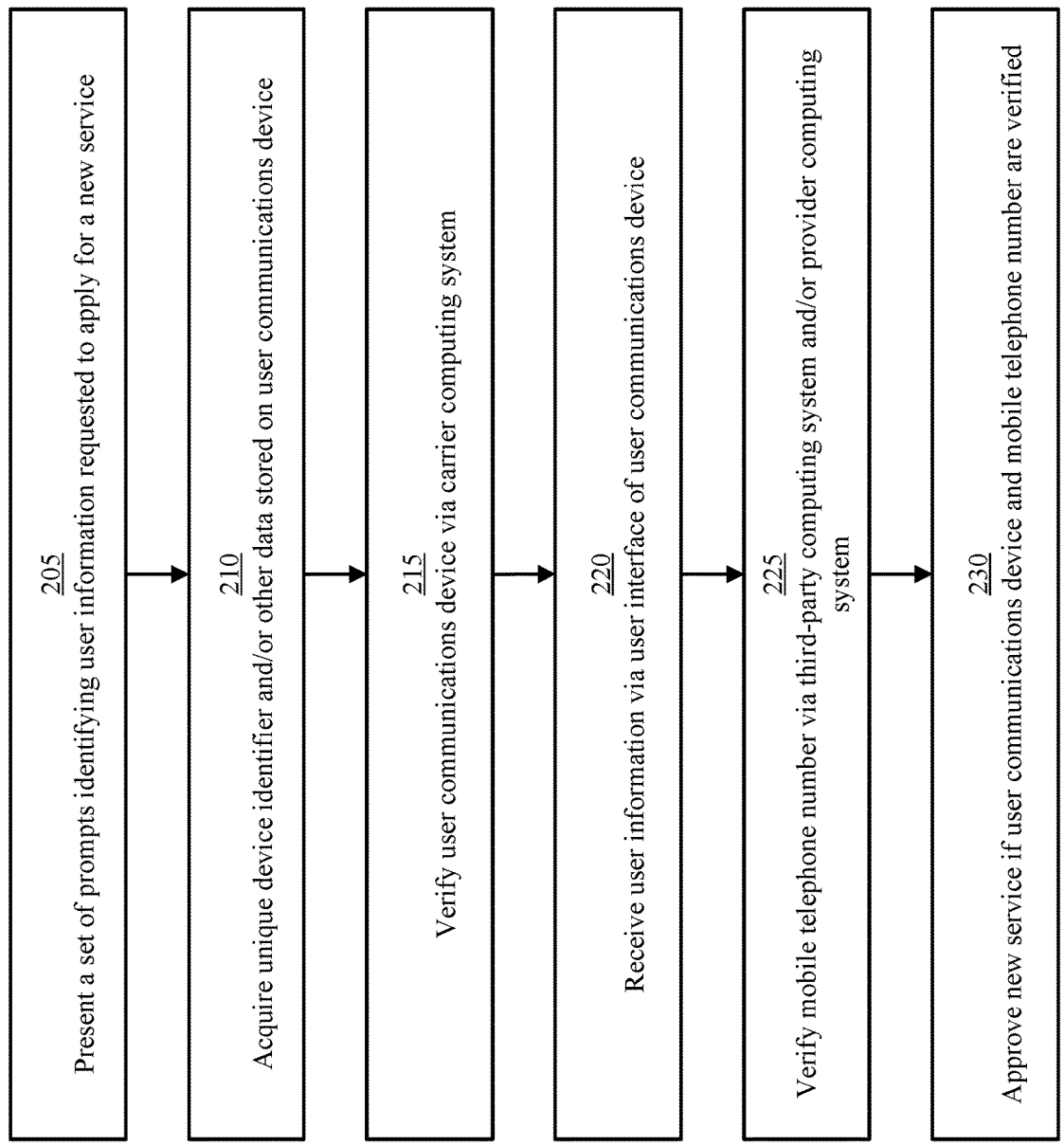
FIG. 2 is a flow diagram of a method of authenticating a user registering for or requesting a new service or product via a provider computing system using a native application running on a user communications device, according to example embodiments.

Referring now to FIG. 2, a flow diagram of a method 200 of passively authenticating a user is shown, according to example embodiments. Method 200 may be performed by the components described with respect to FIG. 1 such that reference may be made to the components contained therein to aid in the description of the method 200. Method 200 may be performed by, for example, the user communications device 110 (e.g., via a processor thereof) in direct or indirect communication with provider computing system 120, carrier computing system 130, and/or third-party computing systems 140.

Figure 5:
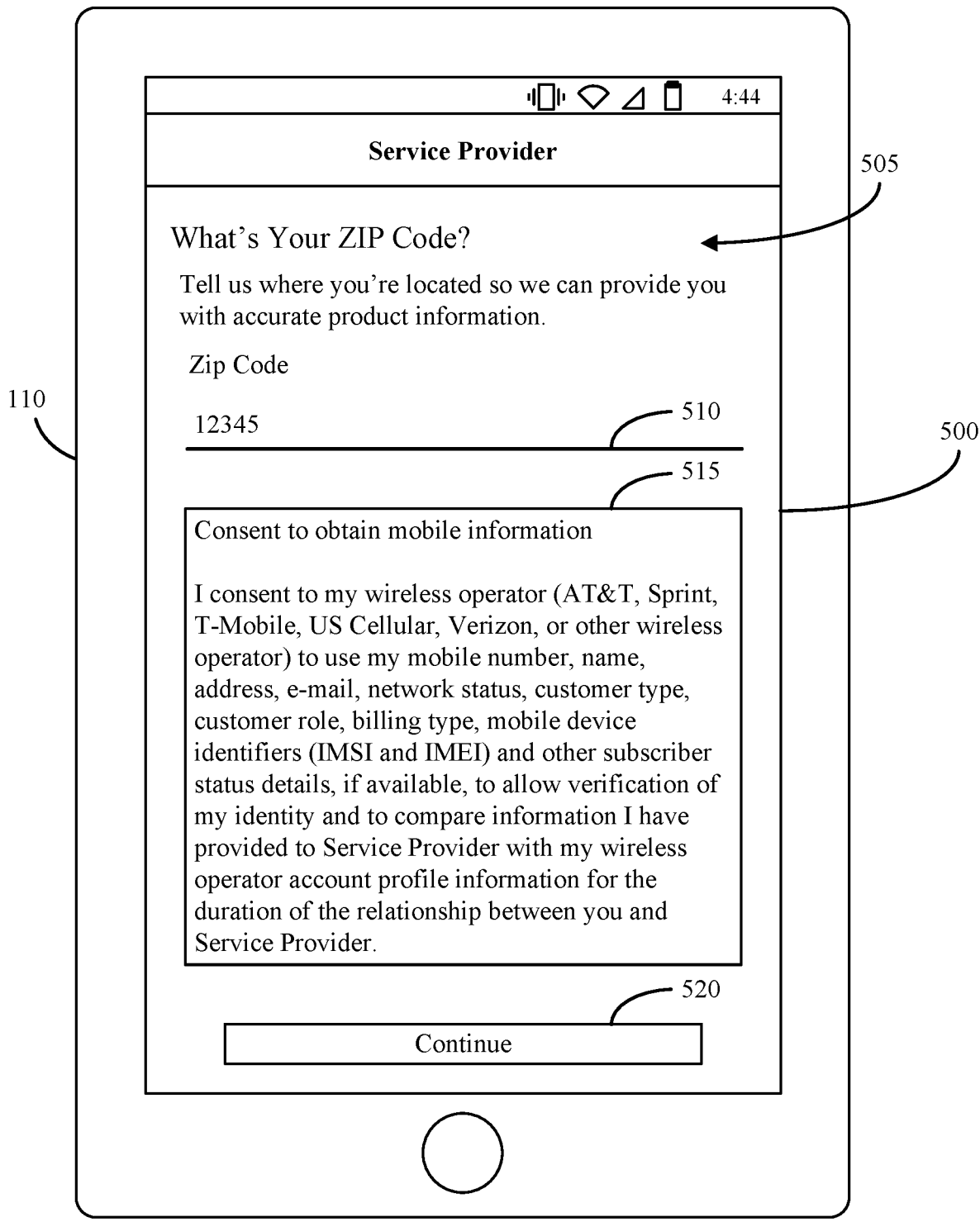
FIG. 5 is an example authentication graphical user interface, according to one embodiment.

At process 205, the native application 112 running on user communications device 110 may present one or more prompts to acquire, receive, or otherwise obtain user information to apply for or request a new service from the service provider. This may be preceded by launching of the native application by the user of the user communications device 110. In some implementations, before the set of prompts are presented, the native application 112 presents one or more preliminary questions to, for example, determine what service is desired or suited to the user, and/or to obtain consent to provide data to, for example, other entities (e.g., a telecommunications operator or carrier aggregator) for authentication purposes. Referring to FIG. 5, native application 112 of user communications device 110 may present pre-verification 500 with a preliminary question 505 (e.g., a zip code), a response to which can be entered into field 510, and a second preliminary question 515 (e.g., consent to obtain mobile information), which can be accepted by selecting the "continue" icon 520.

In an example where the user communications device 110 is a smartphone, the user may select an icon (or other selectable element, such as hyperlinked text) via a user interface 116 of the smartphone to launch the native application 112 and to provide inputs (such as the information requested via preliminary questions). This input may, for example, serve as a command to an operating system of the smartphone causing the smartphone to initialize or otherwise open the native application 112. As will be understood, in various implementations, at least one prompt may be presented at any point prior to process 220, discussed below, and concurrently with process 210 and/or process 215, also discussed below.

At process 210, a unique device identifier stored on the user communications device 110 is acquired. In various embodiments, the unique device identifier is retrieved by the native application 112 via the operating system of the user communications device 110. For example, the native application 112 may use a suitable system call or other request for access or data to a kernel or other component of the operating system providing the environment in which the native application 112 is operating. The unique device identifier may be any alphanumeric identifier stored on any memory of the user communications device 110 that is used to distinguish or uniquely identify the user communications device 110. In various implementations, the unique device identifier may be a mobile equipment identifier (MEID), an international mobile subscriber identity (IMSI), an international mobile equipment identity (IMEI), or other identifier. The unique identifier is generally independent of the user and is assigned before the user communications device 110 is sold to a consumer. Alternatively or additionally, other data related to the user communications device 110 or the user thereof may be acquired for use in verifying the user communications device 110, such as name, address, e-mail, network status, etc.

At process 215, the native application 112 may verify the user communications device 110 via a carrier computing system 130. In various implementations, the native application 112, either directly or via the provider computing system 120 and/or via a third-party computing system 140, provides the unique identifier to the carrier computing system 130. Once the unique identifier is received, the carrier computing system 130 may determine which mobile telephone number is associated with the unique device identifier. Alternatively or additionally, other data are acquired by the native application 112 to be provided to the carrier computing system 130 for verification (such as the mobile telephone number, name, etc.), as discussed.

In various implementations, the carrier computing system 130, the provider computing system 120, and/or third-party computing systems 140 and also make other determinations using the unique device identifier (and/or other data). For example, the carrier computing system 130 may determine whether the unique device identifier is associated with a user communications device 110 that has been reported lost or stolen. In some implementations, the carrier computing system 130 may determine whether the mobile telephone number is active or has been, for example, suspended or inactivated by a telecommunications operator for non-payment, abuse, suspected fraud, or other reasons. In various implementations, this may be determined by the carrier computing system 130 accessing data available in the carrier database 132, and/or by communicating with one or more third-party computing systems 140 (which may include, for example, information reported to law enforcement agencies). In various implementations, certain statuses may be required by the native application 112 and/or by the provider computing system 120 for authentication.

The carrier computing system 130 may then provide the associated mobile telephone number to the provider computing system 120, the third-party computing system 140, and/or to the native application 112. In certain implementations, the carrier computing system 130 returns both the mobile telephone number and a status (e.g., a status of lost, stolen, deactivated, etc.). In some implementations, if the user communications device 110 is reportedly lost, stolen, and/or inactive, the carrier computing system 130 may return a status without returning a mobile telephone number.

In various embodiments, the carrier computing system 130 is provided with additional or alternative information for verification of the user communications device. For example, the native application 112, the provider computing system 120, and/or the third-party computing system 140 may provide the mobile telephone number (which may, in certain implementations, be acquired via the operating system in a similar manner as with the unique device identifier) to the carrier computing system 130, which may then return a unique device identifier. In some implementations, the native application 112 may then confirm that the received unique device identifier matches the unique device identifier stored on the user communications device 110 as part of verification of the user communications device 110. In some implementations, the carrier computing system 130 is provided with both the unique device identifier and a mobile telephone number, and the carrier computing system 130 may return a confirmation that the two are associated (e.g., that the mobile telephone number is registered to the unique device identifier) and/or that the status of the user communications device 110 is active and not reported as lost or stolen. When a mobile telephone number is registered to the unique device identifier, the mobile telephone number may be used to initiate and conduct communications with the user communications device 110 to which the unique device identifier is assigned. Associating a mobile telephone number with a unique device identifier may require application, authentication, verification, or other steps intended to ensure security, verify identity, prevent fraud or theft, track usage, secure financing, etc. For example, a user may be required to provide a social security number and other personal information, and undergo various checks (such as a credit check) when applying for a new mobile telephone number, purchasing or financing a new smartphone, etc. The prior checks, verifications, and other steps can be useful when authenticating users who are applying for a service/product or otherwise requesting access to a portal, secure information, etc.

In some implementations, verification of the user communications device 110 is accomplished via one or more application programming interfaces (APIs). For example, an API of a telecommunications operator, carrier aggregator, and/or third party may be used by the provider computing system 120 to verify the user communications device 110. In some implementations, the native application 112 or provider computing system 120 may use one or more API calls to authenticate the user communications device 110. The API calls may involve the exchange of data as discussed above (e.g., providing a unique device identifier and/or mobile telephone number and receiving a mobile telephone number, a unique device identifier, and/or a status).

Figure 6:
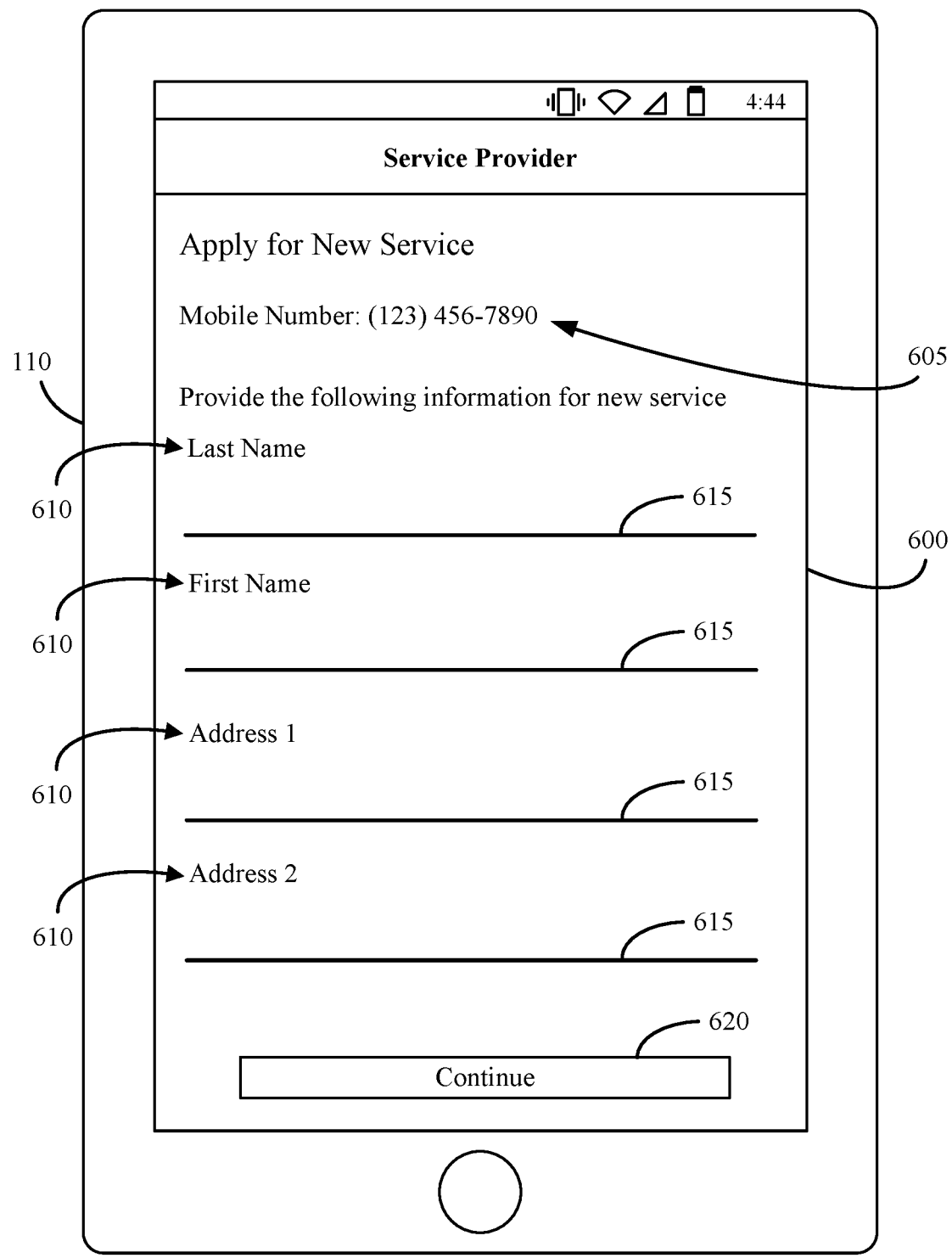
FIG. 6 is an example authentication graphical user interface, according to one embodiment.

At process 220, user information may be received from the user via one or more user interfaces 116 (e.g., touchscreen, microphone, keyboard, stylus, etc.) of the user communications device 110. Referring to FIG. 6, native application 112 may provide a user information screen 600 to request user information via a set of prompts 610 (e.g., Last Name, First Name, Address 1, Address 2), responses to which may be entered by the user (via, e.g., a user interface 116 such as a touchscreen, microphone, keyboard, stylus) into fields 615. In screen 600, the mobile telephone number received and/or verified via the carrier computing system 130 is presented at telephone number field/region 605. In various implementations, the telephone number field/region 605 is non-editable by the user. This helps maintain an association of the mobile telephone number (which has been verified as being associated with the user communication device 110) with the user account. Not allowing a prefilled mobile telephone number to change could deter fraud and thus enhance security. For example, a user who might otherwise attempt to fraudulently open an account with a stolen device, and change the prefilled telephone number of the stolen device when opening the account, might be deterred by the inability to dissociate the mobile telephone number of the stolen device from the new account. Additionally, not allowing the user to change the number reduces the number of entries and decisions to be made by the user when completing an application. It may also simplify the process downstream, as the prefilled number may be deemed to be a verified number that does not need subsequent verification by, for example, sending a message (such as a OTP) to confirm that the user has access to the device. In some implementations, the user may be allowed to enter additional mobile telephone numbers even if the prefilled number cannot be deleted.

At process 225, the mobile telephone number is verified. This can be accomplished via the provider computing system 120 and/or a third-party computing system 140. In some implementations, the native application 112 provides the user information received from the user via the input interface 116 of the user communications device 110 to the provider computing system 120. In various embodiments, the provider computing system 120 determines whether the mobile telephone number has a known association with the user information. In certain implementations, this can be accomplished, for example, by having the provider computing system 120 make an API call of a third party, such as an API of Early Warning Services. In some implementations, this can additionally or alternatively be accomplished by accessing records in accounts database 124, which includes data on users (e.g., existing or past customers) who have previously received services from, or who otherwise associated with, the service provider, such as trusted telephone numbers.

At process 230, the user may be approved for the new service. This may be in response to the verification of both the user communications device 110 (as discussed with respect to process 215) and verification of the mobile telephone number (as discussed with respect to process 225). In various embodiments, the approval may be performed by the native application native application 112 and/or the provider computing system 120. The native application 112 may inform the user of the approval via one or more perceptible elements, which may be visually perceptible elements presented via a display screen or other user interface 116. The new service may be a new account or other service to a new or existing customer.

In various alternative embodiments, other data may alternatively or additionally be used for verification. For example, in certain embodiments, the location (i.e., physical presence) of the user communications device 110 may be used. In some implementations, the location of the device may be determined using a global positioning system (GPS) and/or other devices or components of the user communications device 110. In certain versions, the location of the user communications device 110 may be determined when the native application 112 is first launched. In other implementations, the location of the user communications device 110 may be determined before approval of the new service, and/or when the user is entering user information to apply for the new service. In various implementations, the locations may be provided to the provider computing system 120 and may be stored in accounts database 124 (as, e.g., location at account opening, for subsequent use as deemed useful). In some implementations, location data may be used instead of verification of the user communications device 110, or in addition to verification of the user communications device 110. In some versions, adding location information as another layer of security may be used for certain accounts (e.g., financial accounts or other accounts involving relatively more sensitive information).

In various embodiments, the native application 112 and/or the provider computing system 120 may determine whether the user communications device 110 is physically located at (or in the vicinity of, such as within a predetermined distance of, such as one kilometer) an address entered by the user as user information or an address otherwise associated with the user in a database. In some implementations, potential acceptable or expected addresses for a user communications device 110 may be determined via the provider computing system 120, the carrier computing system 130, and/or one or more third-party computing systems 140. For example, a user's employment address may be determined via a third-party computing system 140 (e.g., based on the user providing the name of the employer, which may be in some implementations determined by accessing one or more directories), and the employment address may be considered to be an acceptable physical location (from a security standpoint) for the user communications device 110 when applying for the new service. Advantageously, determining and using the physical location of the user communications device 110 maintains the passivity of the authentication process, as the user is not required to actively provide responses to challenge questions (such as OTP and OOW). The user's presence at a location corresponding to locations that may be frequented by the user or that are otherwise not unusual or unexpected can be a requirement for authenticating the user.

Figure 3:
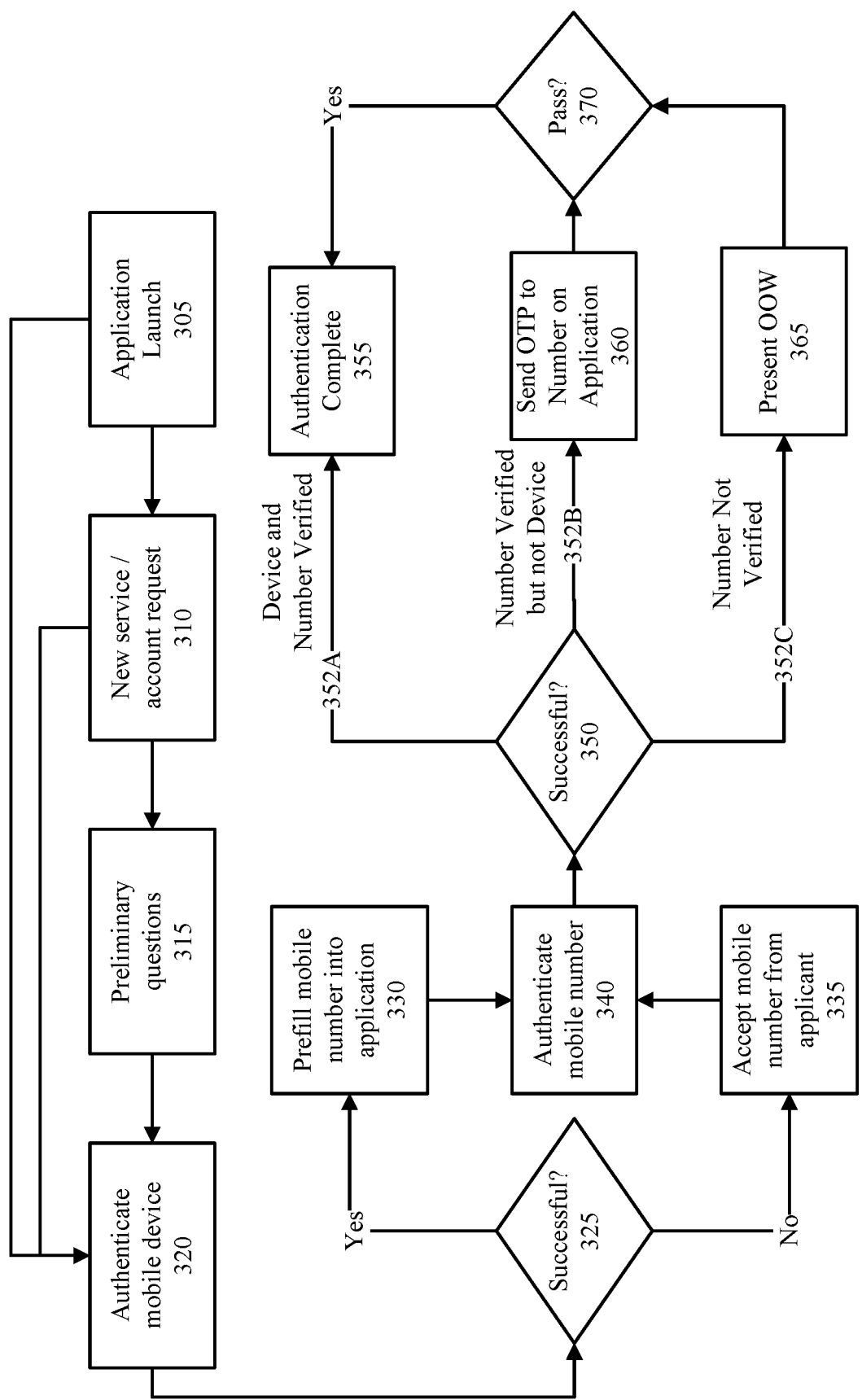
FIG. 3 is flow diagram of a method of authenticating a user, such as a new or prospective user without existing records, by verifying a mobile communications device and a unique mobile address, according to example embodiments.

Referring to FIG. 3, an example process of authenticating a user of a smartphone or other mobile communications device (such as a prospective account holder or other customer) while the user uses a native application 112 to apply for a new account or other service/product/access via a provider computing system 120 is disclosed. At process 305, the native application 112 is launched or otherwise initiated. In some implementations, a new service/account may be explicitly requested by the user via native application 112 (via, e.g., a selection made using a display device or other user interface 116), or alternatively, a process of applying for the new service/account may begin automatically if the new service/account has not previously been requested or set up via the native application 112. In some implementations, process 315 involves optionally asking a certain preliminary question or questions to determine which service is desired or suitable, to acquire consent for sharing of data or other activities involved in authentication, etc. (as can be seen in, e.g., FIG. 5).

A process of authenticating the smartphone may be started at 320. In some implementations, the smartphone 110 and/or the provider computing system 120 may use a first API and service of a third party (e.g., Early Warning Services) to verify the smartphone via a third party computing system 140. In some implementations, the verification may be performed entirely by the third-party computing system 140 providing the API. In other implementations, use of the API may serve to verify the smartphone via a carrier computing system 130 or another third-party computing system 140, as discussed above. If the smartphone is successfully verified at 325, the native application 112 and/or provider computing system 120 may receive a mobile telephone number from the third-party computing system 140 and/or the carrier computing system 130. At process 330, the mobile telephone number may be prefilled into the application for the new account (e.g., into a corresponding mobile telephone number field presented by native application 112). In certain implementations, the field into which the mobile telephone number is prefilled is not editable by the user. If the smartphone is not verified at 325, the user may be allowed to enter his or her telephone number into a corresponding field at 335 (and subsequently undergo more active security measures, as further discussed below).

At 340, the prefilled (330) or entered (335) telephone number may be verified. In certain implementations, the telephone number may be verified by the native application 112 and/or the provider computing system 120 via another API of the same or another third party (e.g., another API of Early Warning Services). If the telephone number is successfully verified at 350, and the smartphone was also successfully verified (352A), then at 355, authentication is complete (i.e., the user is authenticated for the new account or other service). If, however, the telephone number is successfully verified but the smartphone was not successfully verified (352B), then the number that is verified is a number that was entered by the user and not received and prefilled into a corresponding field at 330. In such a case, at 360, a OTP may be used. In this scenario, the OTP is transmitted to the mobile telephone number provided by the user to verify that the user provided a telephone number of a smartphone that belongs to, or is otherwise accessible to, the user. If at 370, the user "passes" (i.e., provides the correct OTP within a predetermined time period, such as 15 minutes), then authentication is complete (355).

If the mobile telephone number (prefilled or entered) was not verified (e.g., the mobile telephone number was not determined to be associated with the user information provided by the user via the native application 112), at 352C, then the user may be presented with one or more OOW questions. The OOW questions may be presented regardless of whether the unverified (352C) mobile telephone number was received via the carrier computing system 130 or the third-party computing system 140 and prefilled into a corresponding field (330), or the number was entered by the user via the native application 112 (335). If all or a suitable number of the OOWs are satisfactorily answered by the user, at 370, the user passes, and authentication is complete (355).

Figure 4:
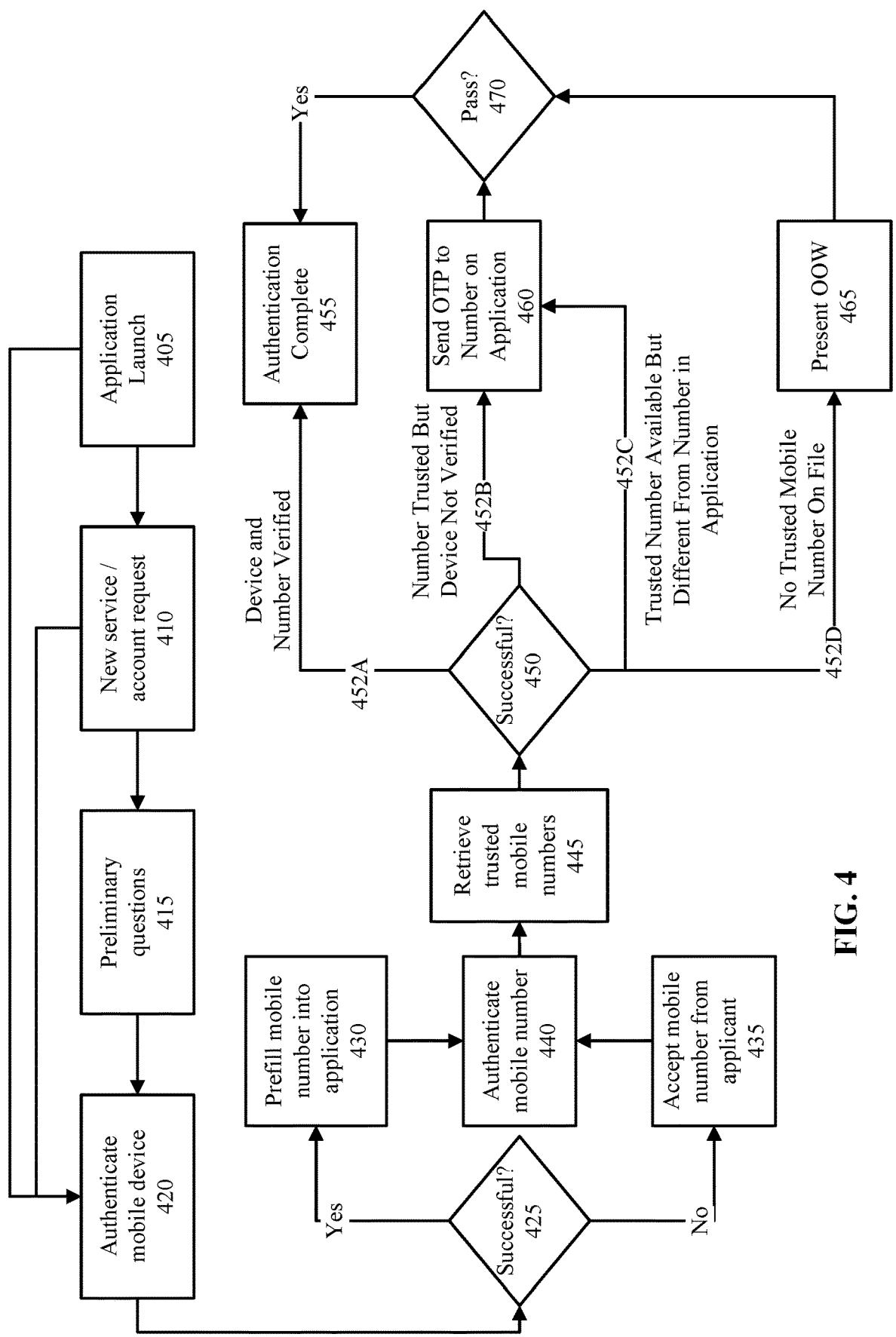
FIG. 4 is flow diagram of a method of authenticating a user, such as a user with an existing record, by verifying a mobile communications device and a unique mobile address, according to example embodiments.

Referring to FIG. 4, an example process of authenticating a user (such as a current or prior customer) of a smartphone while the user uses a native application 112 to apply for a new account or other service via a provider computing system 120 is disclosed. At process 405, the native application 112 is launched or otherwise initiated. In some implementations, a new service/account may be explicitly requested by the user via native application 112 (via, e.g., a selection made using a display device or other user interface 116), or alternatively, a process of applying for the new service/account may begin automatically if the new service/account has not previously been requested via the native application 112. In some implementations, a process 415 involves asking certain preliminary questions to determine which service is desired or suitable, to acquire consent for sharing of data or other activities involved in authentication, etc.

A process of authenticating the smartphone may be started at 420. In some implementations, the smartphone 110 and/or the provider computing system 120 may use a first API of a third party (e.g., Early Warning Services) to verify the smartphone via a third party computing system 140. In some implementations, the verification may be performed entirely by the third-party computing system 140 providing the API. In other implementations, use of the API may serve to verify the smartphone via a carrier computing system 130 or another third-party computing system 140, as discussed above. If the smartphone is successfully verified at 425, the native application 112 and/or provider computing system 120 may receive a mobile telephone number from the third-party computing system 140 and/or the carrier computing system 130. At process 430, the mobile telephone number may be prefilled into the application for the new account. In certain implementations, the field into which the mobile telephone number is prefilled is not editable by the user. If the smartphone is not verified at 425, the user may be allowed to enter his or her telephone number into a corresponding field at 435.

At 440, the prefilled (430) or entered (435) telephone number may be verified. In certain implementations, the telephone number may be verified by the native application 112 and/or the provider computing system 120 via another API of the same or another third party (e.g., another API of Early Warning Services). At process 445, trusted (e.g., previously authenticated, verified, used, known, etc.) telephone numbers may be retrieved from accounts database 124 of the provider computing system 120. The trusted numbers may be part of internal records acquired as a result of a prior relationship with the user. It may then be determined at process 450 whether the telephone is verifiable.

If the telephone number is successfully verified at 450, and the smartphone was also successfully verified (452A), then at 455, authentication is complete (i.e., the user is authenticated for the new account or other service). If, however, the smartphone was not verified (and consequently, the telephone number available to native application 112 is a telephone number entered by the user), at 452B, the mobile telephone number may be a previously-trusted telephone number (based on, e.g., the account database 124). In such a case, at 460, a OTP may be used. In this scenario, the OTP is transmitted to the mobile telephone number provided by the user to verify that the user provided a telephone number of a smartphone is accessible to the user. If at 470, the user "passes" (i.e., provides the correct OTP within a predetermined time period, such as 15 minutes), then authentication is complete (455).

If a trusted mobile telephone number is available in the accounts database 124 but the trusted number does not match the prefilled or entered mobile telephone number, at 452C, a OTP may be used. As with 452B, if at 470, the user "passes," then authentication is complete (455). If there is no trusted mobile telephone number on file (e.g., the mobile telephone number prefilled or entered is not verifiable using internal records), at 452D, then the user may be presented with one or more OOWs. If all or a suitable number of the OOWs are satisfactorily answered by the use, at 470, the user passes, and authentication is complete (455).

Similarly, in various embodiments, instead of or in addition to the verification of the mobile communications device and/or verification of the mobile telephone number, the location of the mobile communications device may be used in authenticating the user. For example, a user may be authenticated by determining whether the location of the mobile communications device corresponds to various user information received by the native application 112 as the user applies for the new service (examples of which are shown in FIG. 6). In some implementations, it may be a requirement for the mobile communications device being authenticated to have a global positioning system (GPS) or other location-determining devices so it can be determined whether the mobile communications device is in an acceptable location (rather than, e.g., in another country, out-of-state, etc.). In some implementations, the location of the mobile communications device may be compared with a location-based response to a preliminary question (such as zip code). For example, if a user is applying for an account in a different state or zip code than provided in response to a preliminary question (see, e.g., FIG. 5), then the user may not be authenticated passively, and an OTP, OOW questions, or other security measures may be used to authenticate the user.

In various alternative implementations, the telephone number may instead be another unique value or "address" used to route communications between and/or among particular devices. For example, the mobile communications device in various embodiments discussed above may be assigned or registered to a unique address by, for example, a telecommunications operator or other communications service provider. The unique address may be used, for example, to route communications between and among the mobile communications device of the user and other devices. The communications signals routed via the unique address may be transmitted via a telephone network, the Internet, or one or more other communications networks. In various versions, the unique address may be a static value that is associated with the unique device identifier and is not changeable by the user without involvement by a telecommunications operator or other communications service provider. In some implementations, a unique address may be, for example, a static Internet Protocol address (IP address) assigned to a communications device for communications routed via the Internet.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, a native application is a locally-installed application. The native application may be able to use device-specific hardware and software, such as a GPS or camera. It is contrasted with web apps that run within an Internet browser. A used herein, a "unique" number is a number that is not associated with or registered to more than one device of a certain type, for the same purpose, or to more than one person or entity at the same time. As used herein, a "set" includes one or more elements or items. Accordingly, "a set of things" indicates "a set of one or more things," "one or more things," or "at least one thing." In other words, a set is an n-tuple, where n is any integer greater than or equal to one, and a set can be a 1-tuple.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the terms input devices or input interfaces, as described herein, may include any type of input device including, but not limited to, a keyboard, a keypad, a mouse, joystick, a stylus, or other input devices performing a similar function. Comparatively, the terms output devices or output interfaces, as described herein, may include any type of output device including, but not limited to, a display screen, computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated.

Other substitutions, modifications, changes and omissions may be made in the design, operating conditions and arrangement of the embodiments without departing from the scope of the present disclosure as expressed in the appended claims.

What is claimed is:

1. A method performed by a service provider computing system via a computer network for passively authenticating a user of a communications device comprising:
   receiving from the communications device, (i) an indication that the user of the communications device is making a request for service, and (ii) user information provided by the user in response to one or more prompts by the communications device;
   acquiring a device identifier that is locally stored at the communications device and that uniquely identifies the communications device;
   transmitting the unique device identifier to a carrier computing system of a telecommunications carrier that provides telecommunications services to the communications device;
   receiving, from the carrier computing system, a telephone number assigned to the communications device by the telecommunications carrier;
   verifying the telephone number from the carrier computing system by determining that the telephone number is associated with the user information provided by the user in response to the one or more prompts,
   wherein the determining is achieved by at least receiving a confirmation from a third-party computing system, and
   wherein the user is authenticated without use of any passwords including a one-time-passcode (OTP) and without use of an out of wallet (OOW) question.

2. The method of claim 1, wherein the device identifier is a mobile equipment identifier (MEID).

3. The method of claim 1, wherein the device identifier is an international mobile subscriber identity (IMSI).

4. The method of claim 1, wherein the device identifier is an international mobile equipment identity (IMEI).

5. The method of claim 1, wherein the communications device is a smartphone.

6. The method of claim 1, wherein the device identifier is acquired via an operating system of the communications device.

7. The method of claim 1, wherein the indication and the user information are received by the service provider computing system via an application running on the communications device.

8. The method of claim 7, wherein the application is a service provider application of a service provider associated with the service provider computing system.

9. The method of claim 7, wherein the user is authenticated without receiving any passwords, passcodes, or biometric data after the application is first launched.

10. The method of claim 1, further comprising transmitting to the communications device, in response to verification of the communications device and the telephone number, an approval of the request.

11. The method of claim 1, wherein the one or more prompts includes a plurality of fields presented, by an application running on the communications device, on a display screen of the communications device, and wherein the method further comprises prefilling, by the application, the telephone number into one of the plurality of fields.

12. The method of claim 11, wherein the field into which the telephone number is prefilled is not editable by the user such that the telephone number is viewable but not changeable by the user.

13. The method of claim 1, wherein the communications device is verified with the carrier computing system using a first application programming interface (API), and the telephone number is verified with the third-party computing system using a second API that is different from the first API.

14. The method of claim 13, wherein the first and second APIs are used by the service provider computing system to verify the communications device and the telephone number.

15. The method of claim 13, wherein the first API is used to provide the device identifier to the carrier computing system and receive, in return, the telephone number assigned to the communications device.

16. The method of claim 13, wherein the second API is used to provide the user information and the telephone number to the third-party computing system, and in return receive from the third-party computing system the confirmation that the telephone number is verified.

17. A method performed by a service provider computing system via a computer network for passively authenticating a user of a smartphone comprising:
   receiving, from the smartphone, (i) an indication that the user of the smartphone is requesting a service, and (ii) user information provided by the user in response to one or more prompts presented by the smartphone;
   acquiring, from the smartphone, a unique device identifier locally stored at and uniquely identifying the smartphone;
   verifying the smartphone by:
   transmitting the unique device identifier to a carrier computing system of a telecommunications carrier that provides telecommunications services to the smartphone, and receiving, from the carrier computing system, a telephone number assigned to the smartphone by the telecommunications carrier;
   verifying the telephone number from the carrier computing system by determining that the telephone number is associated with the user information provided by the user in response to the one or more prompts, wherein the determining is achieved by at least receiving a confirmation from a third-party computing system;
   wherein the user is authenticated without use of any passwords including a one-time-passcode (OTP) and without use of an out of wallet (OOW) question following receipt of the request.

18. The method of claim 17, wherein the unique device identifier is at least one of a mobile equipment identifier (MEID), an international mobile subscriber identity (IMSI), or an international mobile equipment identity (IMEI).

19. The method of claim 17, wherein the indication and the user information are received by the service provider computing system via an application running on the communications device.

20. The method of claim 19, wherein the application is a service provider application of a service provider associated with the service provider computing system.

* * * * *